Inventors
Samuel F. Arbuckle &
Andrew L. Vargha
By
String Harness
Attorney

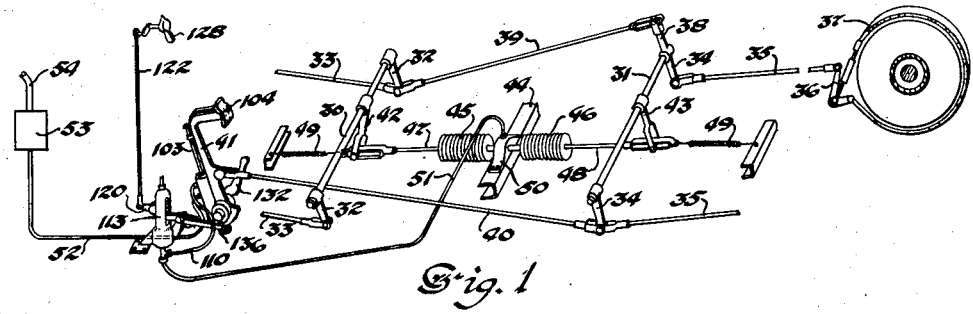

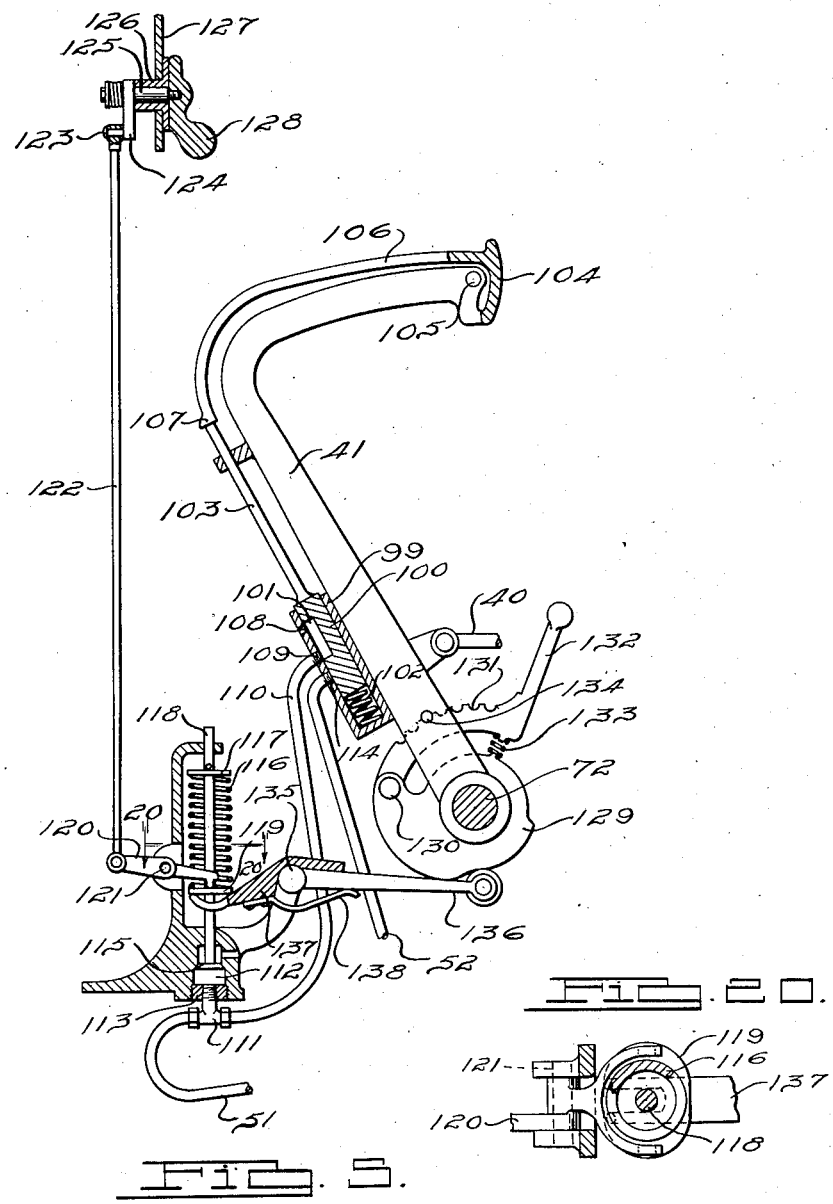

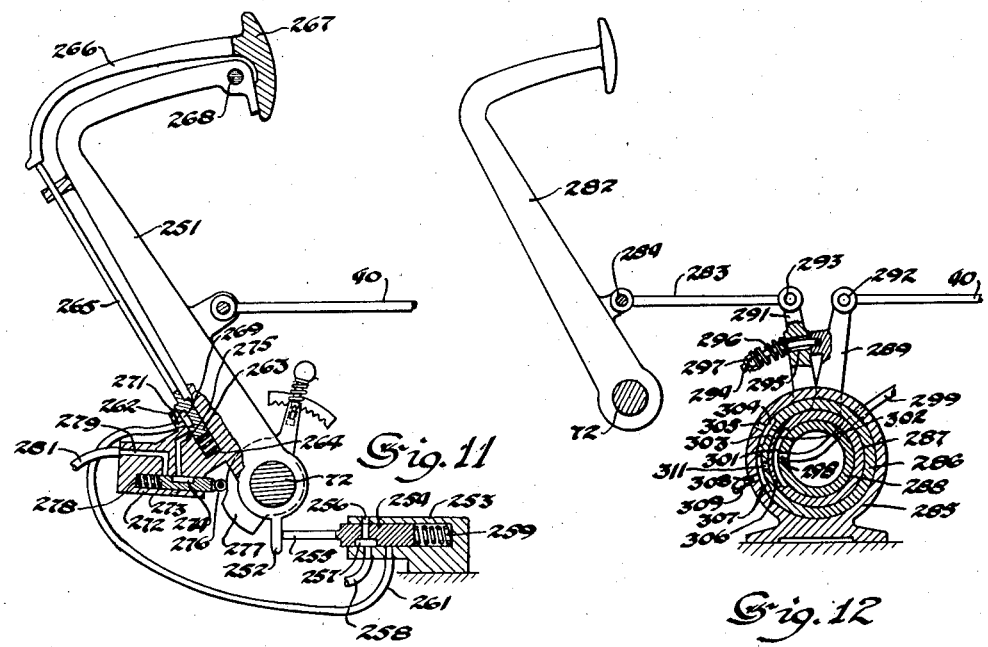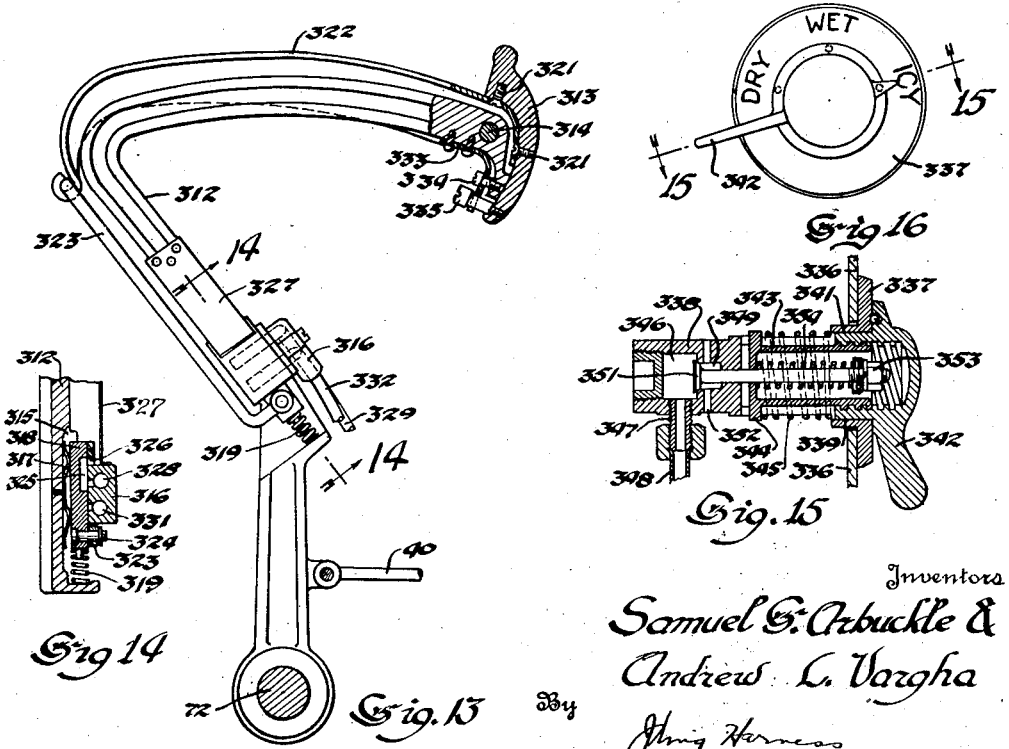

Patented May 9, 1933

1,908,214

UNITED STATES PATENT OFFICE

SAMUEL F. ARBUCKLE, OF HIGHLAND PARK, AND ANDREW L. VARGHA, OF DETROIT, MICHIGAN, ASSIGNORS, BY DIRECT AND MESNE ASSIGNMENTS, TO S. F. ARBUCKLE CORP., A CORPORATION OF DELAWARE

BRAKING MECHANISM

Application filed April 2, 1928. Serial No. 266,551.

This invention relates to the power application of the brakes of motor vehicles and to means for controlling the same, the principal object being the provision of a new and novel construction whereby various advantages may be obtained over the conventional constructions now in use.

Another object is to provide means for actuating the front and rear wheel brakes of a motor vehicle whereby a pre-determined braking effort may be applied to both.

Another object is to provide means for actuating the brakes of a motor vehicle by means of a suction or partial vacuum produced by the vehicle motor power and which will insure a quick and positive action of the brakes thereof.

Another object is to provide means for operating the brakes of motor vehicles comprising a pair of co-operating bellows of different sizes, the larger of which is normally adapted to maintain the smaller in extended position even when under suction, whereby upon admission of air to the larger bellows, the smaller is immediately collapsed and causes application of the brakes.

Another object is to provide means for balancing the actuating forces applied to the rear and front wheel brakes of a motor vehicle including a floating bellows or equivalent structure.

Another object is to provide power means for actuating the brake mechanism of a motor vehicle which is so controlled as to apply the rear wheel brakes in advance of the front wheel brakes.

Another object is to provide a manual and power operating means for applying the brakes of a motor vehicle, the manual and power means being operable independently of each other or simultaneously with each other by means of a single control means.

Another object is to provide a single means for controlling the actuation of the clutch and brakes of a motor vehicle, said control means being operable to actuate the clutch and brakes either independently of each other or simultaneously.

Another object is to provide a remotely controlled manually adjustable means for varying the effective braking action of power operated brakes, the control being provided with visual indicating means.

Another object is to provide manually adjustable means for compensating in the brake control mechanism for the wear of the brake bands in power actuated brake mechanisms independent of the suction controlling means.

Another object is to provide a power operated braking means in which the application of power may be controlled so as to depend upon a pre-determined initial movement of the brake pedal before it becomes effective.

Another object is to provide a power actuated braking means in which the degree of power application is dependent upon the degree of foot pedal movement.

Another object is to provide a manually adjustable means for controlling the effective power application of vacuum operated brakes.

Another object is to provide automatically adjusted means for controlling the effective power application in vacuum operated brakes.

Another object is to provide a novel form of valve mechanism for controlling the power application of vacuum operated power means.

A further object is to provide a system by which quick action of the brakes may be obtained by dumping air into one of the bellows or other contractible and expansible member without causing a similar dumping or air into the intake manifold to cause interference with the carburation of the engine.

The above being among the objects of the present invention, the same consists in certain features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views.

Fig. 1 is a more or less diagrammatic fragmentary perspective view of one arrangement of power means for actuating the front and rear wheel brakes of a motor vehicle.

Fig. 2 is a fragmentary perspective view of another arrangement of power means for the actuation of the brakes of a motor vehicle.

Fig. 3 is a third form of power actuating means for the brakes of a motor vehicle.

Fig. 4 is a vertical sectional view taken centrally and longitudinally through a control pedal for the power actuated braking means shown in Fig. 3, all of the control mechanism being incorporated in the upper end of the pedal.

Fig. 5 is a more or less diagrammatic partially broken vertical sectional view taken centrally through the control mechanism shown in Fig. 1 and illustrating manually adjustable and automatic means for varying the effect of the power operated means shown in Fig. 1.

Figs. 10, 11, 12 and 13 are more or less diagrammatic vertical sectional views of other modified forms of control mechanism.

Fig. 14 is a fragmentary sectional view taken on the line 14—14 of Fig. 13.

Fig. 15 is a vertical sectional view taken longitudinally through the center of a manually controlled member for controlling the effective pressure that may be applied to the power members in vacuum operated brakes.

Fig. 16 is a face view of the member shown in Fig. 15.

Fig. 20 is a cross-sectional view taken substantially upon the line 20—20 of Fig. 5.

Figure 6:
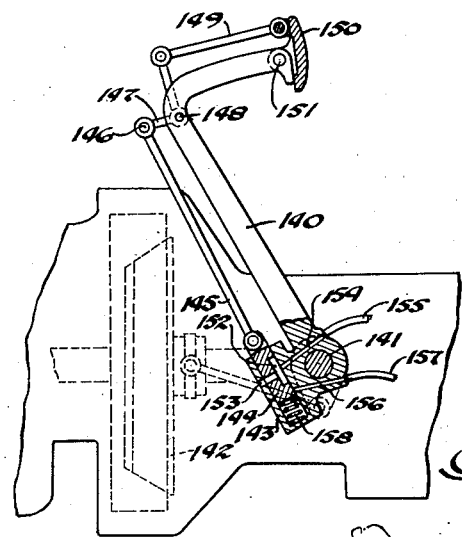
Fig. 6 is a more or less diagrammatic partially broken vertical sectional view taken through a similar form of control mechanism for power actuated brakes illustrating how the same may be employed in connection with the clutch of a motor vehicle.

In the application of power operated brake mechanisms to motor vehicles, no means have heretofore been provided, as far as we are aware, for permitting the maximum braking effort that may be acquired by the braking means to be easily and quickly varied, whereby an excessive power application of the brakes will be prevented under conditions where such excessive application is undesirable such as, for instance, on wet or icy roads. The present invention contemplates the provision of a manually controlled mechanism, whereby the maximum braking effort that may be applied, by so-called vacuum operated brake mechanisms, may be easily and quickly adjusted so as to prevent the wheels from locking under varying conditions of road surface. The invention also contemplates the provision of novel forms of control means for controlling the application of such power actuated braking means, the advantages resulting from which will be apparent from the following description and explanation. The present invention further contemplates the provision of a braking system which, by means of its construction, lends itself to application to various requirements as to braking effort without change in construction of the various parts making up the power system, which is commercially desirable.

Referring to the drawings and particularly to Fig. 1, a brake mechanism applicable to motor vehicles is shown as comprising a front cross shaft 30 and rear cross shaft 31. The front cross shaft 30 is provided at each end with a downwardly extending arm 32, each of which is connected by a rod 33 to the brake on the corresponding front wheel (not shown) of the vehicle on which the mechanism is mounted. The rear cross shaft 31 is provided with a downwardly extending lever 34 at each end thereof and each lever 34 is connected by a rod 35 to the lever 36 which controls the brake 37 on each rear wheel of the motor vehicle. The shaft 31 is also provided with an upwardly extending lever 38 which is connected by a rod 39 to one of the levers 32 on the front cross shaft 30 so that rocking of one of the shafts 30 or 31 will cause a corresponding rocking movement of the other shaft. The free end of one of the levers 34 is connected by a rod 40 to the foot operated pedal 41 which will be described more in detail later. Upon depression of the lever 41, the shaft 31 is caused to rock causing a like rocking movement of the shaft 30 and consequent manual application of the brakes. Power means for applying the brakes are provided as follows:—

The front cross shaft 30 is provided with a downwardly extending yoked arm 42 and the rear cross shaft 31 is provided with a similar downwardly extending arm 43. Supported on the frame cross member 44 between the shafts 30 and 31 are a pair of bellows members 45 and 46. The bellows member 45 is connected by a rod 47 through a lost motion joint to the free end of the lever 42 and the bellows 46 is connected by a rod 48 and lost motion joint to the free end of the lever 43. Coil springs 49 secured to the ends of the rods 47 and 48 constantly urge the mechanism towards inoperative position. The interior of the bellows 45 and 46 are connected together through the supporting member 50, and the interior of the member 50 is connected by means of conduit 51 to the mechanism controlled by the foot pedal, such mechanism being connected by means of a conduit 52 to a tank 53 which, in turn, may be connected by a conduit 54 to the induction system of an internal combustion engine in a manner similar to that shown in the patent to S. F. Arbuckle, numbered 1,296,735 and patented on the 11th day of March, 1919. Upon suitable actuation of the pedal 41, as will later be described, the vacuum in the tank 53 is put into communication with the interior of the bellows 45 and 46 causing the bellows to collapse and thereby rocking the cross shafts 30 and 31 and causing subsequent application of the brakes 37. On release of pressure on the pedal 41, the communication between the tank 53 and the bellows is cut off and air is admitted to the bellows 45 and 46 which thereby allows the springs 49 to again expand the bellows and relieve the application of the brakes. The means for controlling the application of and the amount of so-called vacuum or suction which is applied to the bellows 45 and 46 will be more fully explained in connection with the description of Fig. 5.

In Fig. 2 a modified form of power actuated mechanism is shown. In this figure, the brake cross shafts 30 and 31 are provided with the same levers 32 and 34 as in Fig. 1 together with the same rods 33, 35 and 39 and lever 38. Two bellows 55 and 56 are employed in this construction, the bellows 56 being considerably larger in diameter than the bellows 55. Both bellows are mounted in the rigid frame 57 and their adjacent ends are connected by a rod or other member 58 so that their free ends are constrained to equal movement. A lever 59 pivotally mounted to the upper edge of the frame 57 is slidably connected to the rod 58 and its free end is connected by the rod 60 to the lever 61 secured to the shaft 31, the connection between the rod 60 and lever 61 being of the lost motion type. The interior of the bellows 55 is in constant open communication with a source of suction through the conduit 62 and the interior of the bellows 56 is connected by the conduit 63 to a control mechanism indicated generally as 64 in Fig. 2 and which is shown in detail in Fig. 7, the control mechanism 64 being connected to a suitable source of suction as in the previously described brake mechanism. In the construction in Fig. 2, both bellows 55 and 56 are normally held under a suction or partial vacuum when the brakes are in inoperative position, the effect of this is that the vacuum being equal in both bellows, the larger bellows collapses and overcomes the collapsing tendency in the small bellows causing the small bellows to be held in extended position even though it is under a partial vacuum. In this position the brakes are held in inoperative position and when the control mechanism 64 is suitably actuated, air is admitted to the large bellows 56 which thereby breaks the vacuum in the same and permits it to expand and the small bellows to contract, thus moving the connecting member 58 forwardly and rocking the lever 59, which rocking movement is transmitted by the rod 60 and lever 61 to the shaft 31 and causing consequent application of all of the brakes. The advantage of this mechanism is that a quick application of the brakes may be obtained by dumping a large amount of air into the large bellows without dumping a similar amount of air into the intake manifold which might interfere with carburation of the engine. Upon release of the mechanism 64, as will be hereinafter described, the large bellows 56 is again connected with the suction means and is caused to collapse, thus releasing the brakes.

A still further modified form of actuating means is shown in Fig. 3. In this case, the cross shafts 30 and 31 are not positively connected together as by the rod 39 in Figs. 1 and 2 but instead the lever 38 is connected to one of the levers 32 through the medium of a bellows member 65, rod 66 and connection 67. The interior of the bellows 65 is connected by a conduit 68 to a control mechanism, indicated generally in Fig. 3 as 69 and which is shown in detail in Fig. 4. In this case, when the bellows 65 is connected to a suitable source of suction, it is contracted thus drawing the free ends of the lever 38 and the connected lever 32 towards each other, rocking the shafts 30 and 31 and causing consequent application of the brakes. It will be noted that the bellows 65 floats between the levers 38 and 32 and thereby equalizes the pressure applied to the free ends of the levers 38 and 32 and insures an equal braking effort being applied to both the front and the rear wheel brakes. The bellows 65 may, if desired, be enclosed in a pair of telescoping cup-shaped enveloping members 70 and 71, which are carried by the ends of the bellows members 65 thus protecting the bellows 65 from injury or from contact with dust, dirt, ice or stones.

The bellows which are shown in the drawings may be of any suitable type such as that illustrated in the patent to S. F. Arbuckle, issued Feb. 8th, 1921, and numbered 1,367,792. It is also evident that the conventional cylinder and piston arrangement may be employed in place of the bellows shown without materially altering the present invention, and inasmuch as the use of cylinders and pistons in like constructions is conventional practice, further mention of the same is deemed unnecessary.

The control mechanism for the bellows 65 in Fig. 3 is shown in Fig. 4. In that case, the foot operated pedal 69, which is pivotally mounted at 72 in the conventional manner, is provided with a sleeved head 73 in which a valve body 74 is slidably received. The body 74 is provided with a shoulder 75 and surrounding the same between the shoulder 75 and the adjacent end of the sleeve 73, is a coil spring 76 normally held under tension and urging the valve body axially of the sleeve 73. This axial movement is limited by the pin 77 which is fixed in the valve body 74 and which is adapted to contact against an end of the sleeve 73. The interior of the valve body 74 is hollowed out as at 78 and the bottom of the recess 78 is formed to provide a seat for the valve 79 which is slidably received against the same. The valve 79 is constantly urged against its seat by a spring member 80 slidably engaging the same. The valve 79 is provided with an upstanding tongue 81 to which is secured against relative axial movement the end of the pin 82 which is slidably received in the end of the head 84 of the body 74. The pin 82 is provided with a head 85 and surrounding the pin 82 between the head 85 and the head 84 is a coil spring 86 held under compression and constantly urging the pin 82 and head 85 outwardly of the head 84 and thus urging the valve 79 to move in a corresponding direction relative to its seat. The valve 79 is provided with a passage 87 which when in inoperative position of the valve 79, is connected by the passage 88 in the valve body 74 to the atmosphere. The passage 87 is also connected by the passage 89 in the body 74 to the conduit 68, which in Fig. 3 is shown connected to the bellows 65, although it will be understood that it may be connected to cylinders or other similar actuating mechanism in the same manner. The valve body 74 is provided with a chamber 90 adjacent one end, the interior of which is connected by the conduit 91 to a suitable source of vacuum as in conventional constructions. Received within the chamber 90 is a valve 92 which normally closes the chamber 90 from communication with a passage 93 leading to the atmosphere. The valve 92 is provided with a stem 94 about which a spring 95 is held under compression between the stop 96 carried by the sleeve 73 and a washer carried by the head of the stem 94. The chamber 90 is also connected by a passage 97 to the seat for the valve 79 at a point where it is normally closed by the valve 79, as indicated.

In operation, when it is desired to apply the brakes, the operator applies his foot to the pedal, the foot first engages the head 85 of the pin 82 and compresses the spring 86, moving the pin 82 inwardly. As the pin 82 moves inwardly, the valve 79 is caused to move a corresonding amount. When the valve 79 is thus moved inwardly, the passage 88 to the atmosphere is first closed and as the movement of the valve 79 continues, the passage 87 bridges the passages 89 and 97. The suction in the conduit 91 and chamber 90 is thereby communicated through the passages 97, 87 and 89 to the conduit 68 which, in turn, communicates it with the interior of the bellows 65 (shown in Fig. 3) causing the bellows 65 to collapse and apply the brakes. As the suction in the bellows 65 increases, a point will be reached where the suction is sufficient to unseat the valve 92 and allow air under atmospheric pressure to enter the chamber 90, thus preventing more than a pre-determined suction to be applied to the bellows 65. This feature is disclosed in the patent to S. F. Arbuckle, issued February 12th, 1918, and numbered 1,256,284. If this amount of suction is not sufficient for the amount of braking effort applied to the wheels that is desired, the operator may apply more pressure to the head 84 of the body 74 and in overcoming the tension of the spring 76, cause the body 74 to slide in the sleeve 73. This movement of the body 74 relative to the sleeve 73 places the spring 95 under a greater compression so that a greater suction within the chamber 90 and consequently in the bellows 65 is necessary before the valve 92 will again unseat and allow air under atmospheric pressure to enter the chamber 90 and thus prevent a greater suction to be built up within the bellows 65. It will be apparent, of course, that the amount of depression of the members 74 relative to the sleeve 73 will regulate the amount of suction within the bellows 65 and that the effective braking effort may thus be variably controlled. Inasmuch as the lever 69 is connected by the rod 40 to the brake mechanism, it will be apparent that if, for any reason, the power mechanism should become inoperative, the brakes may be applied by pressure of the foot. It will also be apparent that as soon as the power means is applied and the shaft 31 is caused to rock, the pedal 69 will be caused to rock a corresponding amount and thus tend to draw away from the foot of the operator. When this happens, the head 85 of the pin 82 will, of course, move outwardly relative to the head 84 and communication with the suction producing means will be interrupted. This feature is a material aid in the control of the brakes as will be readily apparent.

In Fig. 5 is shown in greater detail the control mechanism for the bellows 45 and 46 shown in Fig. 1. In this case the lever 41 is provided on its forward face with a housing 99, closed at its lower end. Slidably received within the housing 99 is a sliding member 100, having a passage 101 therein. A spring 102 held in compressed condition between the lower end of the member 100 and the closed end of the housing, normally urges the member 100 upwardly. The member 100 is provided with a stem 103. The pedal pad 104 is pivotally mounted at 105 on the free end of the lever 41 and is provided with an extension 106 which terminates in a foot 107 which slidably engages the free end of the stem 103. It will be apparent that the lever 41 may be rocked about its shaft 72 without rocking the pad 104 if the pad is held against its stop, or that the pad 104 may be rocked without rocking the lever 41 on the shaft 72, or the pad 104 may be rocked simultaneously with the lever 41. If the pedal pad 104 is rocked by pressure applied to the upper edge of the same, the foot 107 will be moved downwardly and acting through the stem 103 will cause the member 100 to move downwardly in the housing 99 against the pressure of the spring 102. When the member 100 is in normal inoperative position in the housing 99, the passage 101 is connected by the passage 108 in the wall of the housing 99 with the atmosphere and is also connected by the passage 109 with the conduit 110 which leads to the fitting 111 which connects with the chamber 112 in the member 113. The fitting 111 is also connected with the conduit 51 which in Fig. 1 is shown as being connected to the bellows 45 and 46. The walls of the housing 99 are also provided with an opening 114 normally closed by the member 100 and which is connected by the tube 52 to a source of suction, as previously described.

The operation of the construction shown in Fig. 5 thus far described, is similar to the operation of the construction shown in Fig. 4 except for the difference in the means for operating the valve member 100. In other words, if the pad 104 is rocked, the member 100 is moved so that the passage 101 is cut off from the atmosphere and may be moved to bridge the openings 109 and 114 whereupon the suction in the conduit 52 is communicated through the conduits 110 and 51 with the bellows 45 and 46, with consequent operation of the brakes. In this construction, however, a modified form of control means for the suction limiting valve 115 is provided as follows:—

The valve 115 which is normally urged to seating position by the spring 116 controls the admission of air under atmospheric pressure to the chamber 112 so as to limit the amount of suction which may be built up in the bellows. The spring 116 is held under compression between the washer 117 secured on the stem 118 of the valve 115 and a washer 119 slidably received on the stem 118. The position of the washer 119 is controlled in the following manner:—

A cam 129 is rotatably mounted on the shaft 72 adjacent one side of the lever 41. Pivotally connected to the cam 129 by the pin 130 is a ratchet segment 131 provided with a manually engageable lever 132. The free end of the segment 131 is normally urged outwardly by a coil spring 133 held under compression between the same and the cam 129. The lever 41 is provided with a pin 134 which is adapted to engage one of the teeth on the ratchet member 131 thereby locking the cam 129 in rotatably adjusted position relative to the lever 41. The rotatable position of the cam 129 relative to the lever 41 may be varied by depressing the arm 132 so as to compress the spring 133 thereby drawing the segment 131 out of engagement with the pin 134 after which the cam may be rotated to the desired position and the arm 132 released causing the segment to again engage the pin 134. Pivotally mounted at 135 on the bracket 113 are a pair of oppositely extending levers 136 and 137, the free end of the lever 136 being normally held against the cam 129 and the free end of the lever 137 supporting the washer 119 on the valve stem 118. A flat spring 138 secured to the lever 137 contacts with the lever 136 and upon clockwise rotation of the lever 136 about the pin 135, urges the lever 137 to like movement but permits the lever 136 to move independently of the lever 137 when sufficient pressure is exerted on the free end of the lever 137 to overcome the force of the spring 138. The cam 129 is so formed that as the pedal lever 41 is depressed, the free end of the lever 136 is moved downwardly thus moving the free end of the lever 137 and washer 119 upwardly and tending to compress the spring 116 so that a greater suction must be present in the bellows 45 and 46 in Fig. 1 before the valve 115 will open and limit such suction. The ability to manually adjust the rotatable position of the cam 129 permits the adjustment of the mechanism so that a pre-determined movement of the lever 41 will always exert a pre-determined braking pressure on the brakes regardless of the amount of wear on the brake bands. In other words, the more the brake bands wear, the more the cam 129 may be shifted to compensate for the same. Manually adjustable means are also provided for limiting the amount of braking effort which the bellows 45 and 46 may apply in order to correspond with the condition of the road surface over which the vehicle may be traveling. This means comprising a lever 120 pivoted at 121 on the member 113, the one end of the lever extending over into engageable but normally spaced relationship with respect to the washer 119. The opposite end of the lever 120 is connected by a rod 122 to the pin 123 carried by the crank arm 124. The crank arm 124 is fixed to a shaft 125 which is rotatably mounted in fitting 126 which may be mounted on the instrument board, dash or other supporting surface 127 of the motor vehicle.

The rotatable position of the shaft 125 is controlled by a manually engageable arm or pointer 128. By rotating the arm 128, the lever 120 may be caused to pivot about the pin 121. The result is that the vertical movement of the washer 119 by the arm 137 from actuation through the arm 136, and cam 129 may be limited by controlling the lever 120 by the arm 128. For instance, should the surface of the road over which the vehicle is traveling be icy, the arm 128 may be positioned so as to move the free end of the lever 120 to its lowermost position. Then upon a slight depression of the lever 41, the arm 137 will move the washer 119 into contact with the depressed end of the lever 120 and further upward movement and consequent compression of the spring 116 will be prevented, further rotation of the lever 41 and cam 129 merely causing a rotation of the arm 136 and deflection of the spring 138 without causing a corresponding movement of the lever 137.

The position of the arm 128 consequently limits the effective suction that may become present in the bellows 45 and 46 and consequently limits the effective braking pressure that may be applied to the wheels of the vehicle. This feature is of great importance in power actuated brakes of this type in that heretofore no means have been provided whereby the effective braking effort which may be applied to the wheels could be easily and quickly varied by the operator to suit the condition of the road surface. This same feature is claimed for some of the existing vacuum operated constructions now on the market, but it is here pointed out that in those constructions the claim to this feature is based on the vacuum obtained in the engine manifold at engine idling speeds and does not take into account the possible degree of vacuum that may occur in the manifold when the clutch is engaged and the vehicle of which it forms a part is travelling at a speed which drives the engine at speed in excess of idling speed. For instance, such constructions can not compensate for cases where the vehicle is coasting down a mountain and the engine is being employed as a brake. In such cases the degree of vacuum in the intake manifold may be several times as high as that present at idling speeds of the engine and an application of the power brakes may cause a serious skid. In the present invention, the degree of vacuum may be absolutely and accurately controlled in such a case so as to obviate any possibility of a skid.

In Fig. 6, a modification of the control mechanism is shown applied to the clutch pedal of a motor vehicle. In this case, the pedal lever 140 is connected to the clutch shaft 141, and the clutch shaft 141 may be connected to a clutch of conventional design such as 142 so that depression of the lever 140 will cause the clutch to become disengaged, as is the usual practice. In this case, the lever 140 has formed thereon a housing 143 having a closed end and in which is slidably received a valve member 144. The valve 144 has pivotally connected thereto, a rod 145 which is pivotally connected at 146 to the free end of a bell crank 147 which is pivotally mounted on the lever 140 at 148. The other arm of the bell crank 147 is pivotally connected by the rod 149 to the upper end of the pedal pad 150 which is connected to the lever 140 at 151. The valve 144 is provided with a chamber 152 and the housing 143 is provided with an opening 153 which normally connects the chamber 152 with air under atmospheric pressure. A passage 154 in the lever 140 connects the chamber 152 with a conduit 155 which leads to the brake operating bellows. A second passage 156 in the lever 140 and which is normally closed by the valve 144 is connected by the conduit 157 to the source of suction. A coil spring 158 held under compression between the closed end of the housing 143 and the adjacent end of the valve 144 normally urges the valve 144 and connected parts including the pad 150 to normally inoperative position. It will be apparent that if the pad 150 is pivoted about the pin 151 in a counter-clockwise direction as viewed in the drawing, the valve 144 will be caused to move downwardly against the force of the spring 158, thus cutting off communication between the chamber 152 and opening 153 and upon sufficient movement, the chamber 152 will connect the passages 154 and 156, thus communicating the suction producing means or source of suction with the brake operating bellows and causing contraction of the same with consequent application of the brakes, as previously described. With this construction it will be apparent that the pedal 140 may be rotated about the axis of the clutch shaft 141 to disengage the clutch without pivoting the pad 150 relative to the lever 140, thus permitting the clutch to be disengaged without causing application of the brakes. Furthermore, the pad 150 may be pivoted on the lever 140 without causing a pivotal movement of the lever 140 relative to the axis of the shaft 141, thus permitting the brakes to be applied without disengaging the clutch. It will also be apparent that with this construction, the clutch may be disengaged and the brakes may be applied simultaneously. The valve construction as well as the means of operating it, as shown in this figure, may also be employed on the usual brake pedal, such as those previously described as will readily be apparent.

Figure 7:
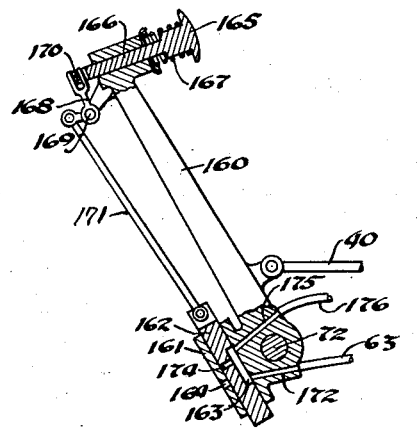
Fig. 7 is a more or less diagrammatic fragmentary vertical sectional view of a modified form of control mechanism in which the power actuated braking means is applied previous to or simultaneously with the manually operated braking means.

In Fig. 7, a modified form of control means is shown for use in connection with the brake operating mechanism shown in Fig. 2 and indicated generally as 64 in that figure. In this figure the lever 160 has a housing 161 formed thereon in which a valve member 162 is slidably received. The valve member 162 is provided with a chamber 163 and a cross passage 174. The housing 161 is provided with an opening 164 normally out of matching relationship with the passage 174 which is normally closed by the wall of the housing 161. A pad 165 having a stem 166 slidably received in the upper end of the lever 160 is constantly urged away from the lever 160 by means of the coil spring 167 held under compression between the pad 165 and the adjacent face of the lever 160. The forward end of the stem 166 which projects through the lever 160 is slidably connected by the pin 170 to one arm of the bell crank 168 which is pivotally mounted on the lever 160 at 169, and the other arm of the bell crank 168 is pivotally connected by the rod 171 to the member 162. Thus, if the pad 165 is depressed relative to the lever 160, the movement of the pad 165 rocks the bell crank 168 and moves the member 162 downwardly. The lever 160 is provided with a pair of passages 172 and 175 which are normally bridged by the chamber 163 in the member 162. The passage 172 is connected by the conduit 63 to the large bellows 56 shown in Fig. 2, and the other passage 175 is connected by a conduit 176 to a second conduit 177 which extends to the source of suction. From the above, it will be apparent that when the pad 165 is in normal position, the suction from the suction-producing means is acting on both bellows 55 and 56 and causing the large bellows to overcome and expand the small bellows. In this condition of the bellows, if the pad 165 is depressed, the member 162 moves downwardly, first cutting off the passage 175 leading to the source of suction and then placing the passage 174 and the opening 164 in communication, and allowing air to flow through the passage 172 and conduit 63 to the large bellows 56, thus relieving the suction within it and permitting the small bellows 55, which is maintained under a constant suction, to collapse and apply the brakes. When the pressure on the pad 165 is released, the member 162 moves upwardly, first cutting off communication of the chamber 163 with the atmosphere and then connecting the passage 172 with the suction-producing means through the passage 175, thus releasing the brakes by collapsing the large bellows. The spring 167 may be varied to suit the desires of the designer so that the power brake means may be operated immediately upon application of pressure to the pad 165 or may be sufficiently strong so that the lever 160 must be rotated a sufficient amount to cause a manual application of the brakes before the power braking means becomes effective. As is also indicated in Fig. 2, a control means such as is shown in detail in Figs. 15 and 16 is preferably provided in the suction line 177 in order to control the maximum suction which may be built up in the bellows. In addition, the conduit 63, or a portion thereof, is of a relatively small diameter so as to materially restrict the flow of air through the same from the large bellows to the engine manifold. This is done so as to prevent an excessive amount of air from being dumped all at once into the manifold and thus possibly interfere with the carburetion system of the engine. It is to be noted, however, that such restriction in no way affects the rapidity with which air may be fed to the large bellows to allow it to expand, and it therefore does not affect the rapidity with which the brakes may be applied.

Figure 8:
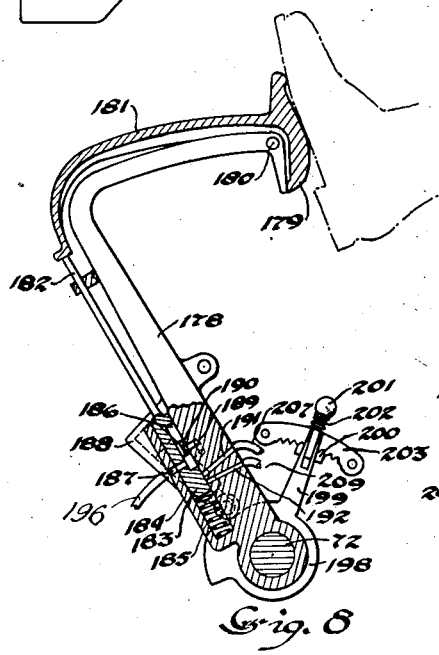
Fig. 8 is a more or less diagrammatic fragmentary vertical sectional view of another form of control mechanism in which the manually operated and power operated braking means may be operated independently of each other or simultaneously with each other and in which means are provided for compensating for the wear of the brake bands.
Figure 9:
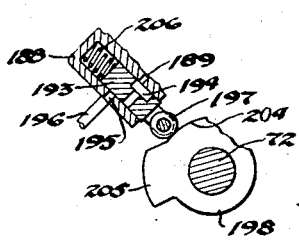
Fig. 9 is a sectional view taken in a plane parallel to the view in Fig. 8 but through the cylinder shown on the far side of the view in Fig. 8.

In Figs. 8 and 9, a modification of the construction shown in Fig. 5 is shown. In this construction, the pedal lever 178 is provided with a pad 179 pivoted thereto at 180 and having an extension 181 slidably engaging the end of the valve stem 182. The valve 183 is slidably received in the housing 184 and is normally held in raised position by means of the coil spring 185. The valve 183 is provided with a chamber 186 which is normally connected with the atmosphere through the opening 187 in the wall of the housing 184. The lever 178 in this case is also provided with a second housing 188, shown in section in Fig. 9, and which lies on the far side of the housing 184, as viewed in Fig. 8. The interior of the housing 184 is normally connected to the interior of the housing 188 by the passage 189. The passage 189 at the point where it communicates with the housing 184 is normally closed by the bridge 190 formed on the valve 183. The lever 178 is also provided with a pair of passages 191 and 192 which lead into the housing 184, one slightly above the other and both of which are normally closed by the valve 183. When the pad 179 is pivoted on the pin 180 so as to cause the valve 183 to move downwardly against the force of the spring 185, the chamber 186 is first cut off from communication with the atmosphere through the opening 187. The bridge 190 then clears the passage 189 and the chamber 186 then comes into communication with the passage 191, and upon further movement of the pad 179, then comes into communication with the passage 192. This connects the passage 189 with the passages 191 and 192. The housing 188 is provided with a valve 193 therein, the valve 193 being provided with a chamber 194 constantly connected to the passage 189, and the housing 188 is provided with a passage 195 normally closed by the valve 193 and which is connected by the conduit 196 to the source of suction. The valve 193 is provided with a roller 197 which bears on the surface of the cam 198, which is rotatably supported on the shaft 72 independently of the lever 178. The cam 198 is provided with an arm 199 which carries a toothed member 200 on the pin 201, which is constantly urged outwardly by the spring 202, and which normally engages the sector 203 which may be secured to the transmission (not shown) or other suitable supporting surface of the vehicle. The cam 198 is provided with a relatively low surface portion 204 and a raised surface portion 205 and the rotatable position of the cam 198 is so controlled that when the lever 178 is in inoperative position, the roller 197 is urged by the coil spring 206 against the surface 204. The cam 198 is further positioned that when the lever 178 is pivoted in a counter-clockwise direction about the axis of the shaft 72, the roller 197 is caused to ride up on the cam surface 205 and thus causes the valve 193 to move upwardly until the chamber 194 is put into communication with the opening 195 and therefore the source of suction. In such case the suction transmitted through the conduit 196 is communicated with the passage 189. If now the pad 179 is rocked on the pin 180, the suction in the passage 189 will be communicated to the passage 191 and also with the passage 192, if the pad 179 is rocked sufficiently. The passage 191 is connected by a conduit 207 with a bellows 208, shown in Fig. 19, for operating the rear brakes of a motor vehicle and the passage 192 is connected by a conduit 209 with a bellows 210, shown in Fig. 19, for operating the front wheel brakes of the same motor vehicle. Thus, by this construction, the pad 179 may be rocked sufficiently to apply only the rear wheel brakes or may be moved so as to apply both the front and rear wheel brakes. It is preferred in this construction, that the cam 198 be so adjusted that the lever 178 must be rocked a sufficient amount to apply a material braking action by foot pressure only before the roller 197 is moved up on the cam surface 205 so as to put the power operated braking means into operation, although it will be understood that the cam 198 may be so adjusted that the roller 197 will, at all times, be caused to ride on the raised portion 205 of the cam. By adjusting the position of the cam arm 199 relative to the sector 203, the pivotal position of the lever 178 at which the power operated braking means may be caused to become effective, may be readily controlled as will be apparent.

Figure 10:
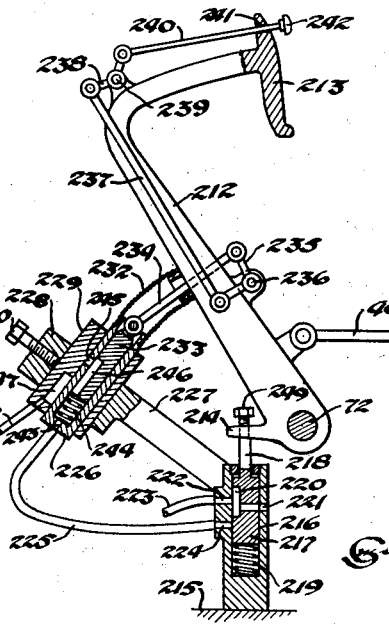

In Fig. 10, the brake pedal 212 has a pad 213 formed integral therewith. The lever 212 near its point of pivot has formed integral therewith, a finger 214. Secured directly below the finger 214, to any suitable supporting surface such as 215, is a bracket member having a vertically disposed housing 216 formed therein. Slidably received within the housing 216 is a sliding member 217 provided with a stem 218. The stem 218 is constantly urged into contact with the finger 214 by means of a coil spring 219 held under compression between the end of the member 217 and the closed end of the housing 216. The member 217 is provided with a chamber 220 which is normally connected with the atmosphere through the opening 221 in the wall of the housing 216. Another opening 222 in the wall of the housing 216 and which is in constant communication with the chamber 220, is connected by the conduit 223 to the brake operating bellows. A third opening 224 in the wall of the housing 216 and normally closed by the member 217 is connected by the conduit 225 to the sleeve 226. From the construction thus far described. it will be apparent that the brake operating bellows is normally in communication with the atmosphere so as to allow it to move to extended position, and that as the pedal 212 is rocked about its shaft 72, the finger 214 will depress the member 217, first cuttitng off the chamber 220 from the atmosphere and then connecting the openings 222 and 224 so that any suction that may be present in the conduit 225 will be transmitted to the brake operating bellows.

Extending upwardly and forwardly from the housing 216 is a bracket 227 terminating at its end in a guide 228. Slidably received in guide 228 is a sleeve member 229 held in adjusted axial position therein by means of the set screw 230. Slidably received in the sleeve 229 is a second sleeve 226 which is connected by a flexible tubing 232 to the lever 212 so as to be caused to move in accordance with the movement of the lever 212. Slidably received within the sleeve 226 is a valve 233. The tube 232 may be of any of those conventional constructions now found on the market which, while readily bendable, will transmit a material axial force without elongation or contraction when properly guided or when employed in short lengths. The valve 233 is connected by a rod 234 extending through the flexible tubing 232 to the free end of one arm of the bell crank 235 which is pivotally mounted at 236 on the pedal lever 212. The other arm of the bell crank 235 is pivotally connected by means of the rod 237 to one arm of the bell crank 238 which is pivotally mounted at 239 adjacent the upper end of the lever 212, and another rod 240 pivotally connected with the other arm of the bell crank 238 slidably extends through an opening 241 in the pad 213, it being provided with a button member 242 on the face of the pad 213. By moving the button 242 relative to the pad 213 with the foot, the valve 233 is caused to have a relative sliding movement in respect to the sleeve 226. The sleeve 226 is provided with an opening 243 in its closed end to which the conduit 225 is connected, as previously described, and a spring 244 held under compression between the closed end of the sleeve 226 and the adjacent end of the valve 233, normally urges the valve 233 upwardly. The sleeve 226 is also provided with an opening 245 in its side walls and the space between the end of the valve 233 and the closed end of the sleeve 226 is normally connected thereto by means of the passage 246 in the valve 233. The sleeve member 229 is provided with a chamber 247, which is connected by the conduit 248 with the source of suction, the chamber 247 being normally out of communication with the opening 245 due to the fact that the sleeve 226 is normally held in a position such that the opening 245 is closed by the walls of the sleeve 229.

It will now be apparent that if the lever 212 is rocked sufficiently to move the valve 217 so as to cut off the brake actuating bellows from communication with the atmosphere and place the chamber 220 so as to bridge the openings 222 and 224, as previously described, this movement of the lever 212 will move the sleeve 226 downwardly in the sleeve 229 until the opening 245 is put into communication with the chamber 247 at which time the suction in the conduit 248 will be transmitted through the chamber 247, opening 245, passage 246 and opening 243 to the conduit 225 and thence, as previously described, to the brake operating bellows and cause the same to be contracted with consequent application of the brakes. While the suction is thus being transmitted to the brake operating bellows, if the button 242 is depressed, the valve 233 will be moved downwardly relative to the sleeve 226 and will cut off communication between the passage 246 and the chamber 247 through the opening 245, thus interrupting the communication between the source of suction and the brake operating bellows. In this manner, the operator may by playing his foot on the button 242, control the amount of suction which may be built up in the brake operating bellows and consequently the braking action on the vehicle. It will also be apparent in this construction that the pedal 212 must be moved through a pre-determined degree of rotation before the action of the bellows may take place and this degree of movement may be controlled by varying the position of the sleeve 229 axially of the guide 228. The degree of movement necessary to move the valve 217 so that the chamber 220 will bridge the openings 222 and 224, may also be varied by providing a screw such as 249 in the finger 214 in such a position that the end of the screw contacts with the stem 218.

Fig. 11 shows a construction similar in many respects to the construction shown in Fig. 10, that is, the pedal 251 is provided with a finger 252 which corresponds with the finger 214 in Fig. 10. A housing 253 enclosing a valve 254 provided with a stem 255 corresponding to the housing 216, valve 214 and stem 218, in Fig. 10, is also provided. The housing 253 is provided with an opening 256 which normally connects the chamber 257 in the valve 254 with the atmosphere, and the chamber 257 is similarly constantly in communication through a conduit 258 with the brake actuating bellows. A coil spring 259 constantly urges the valve 254 towards the left, as viewed in Fig. 11. When the pedal 251 is depressed, the finger 252 acting through the stem 255 moves the valve 254 so as to cut off the brake actuating bellows from the atmosphere and causes the chamber 257 to connect the conduit 258 with the conduit 261. The lever 251 has a housing 262 formed thereon in which a valve 263 is slidably received and constantly urged upwardly by the spring 264. The valve 263 is provided with a stem 265 which slidably engages the extension 266 of the pedal pad 267 which is pivotally connected to the lever 251 at 268. The valve 263 is provided with a chamber 269 which is constantly connected through the passage 271 with the conduit 261. The lever 251 is provided with a second housing 272 in which a valve 273 provided with a chamber 274 is slidably received. A passage 275 connecting the housings 262 and 272 is normally closed by the valve 263 and is in constant communication with the chamber 274 in the valve 273. The valve 273 is provided with a roller 276 which is constantly urged against the cam 277 by the coil spring 278. This cam member 277 is rotatably mounted on the shaft 72 and is identical in all respects with the cam member 198, as shown in Fig. 8, so that when the lever 251 is rocked, the roller 276 riding up on the raised portion of the cam 277, moves the valve 273 to the left, as viewed in Fig. 11, until the chamber 274 connects the passage 275 with the passage 279 which is connected by the conduit 281 to the source of suction.

In the operation of this construction, the lever 251 must first be rocked a pre-determined degree before it is possible to actuate the mechanism so as to transmit a suction to the brake operating bellows by rocking the pad 267. The point at which the suction may be transmitted between the passages 275 and 279 during the rocking of the lever 251 may be adjusted by varying the rotatable position of the cam 277, and the application of suction to the brake operating bellows after such rocking movement of the pedal 251 has occurred, is under the control of the operator through pivotal movement of the pad 267. as will readily be apparent.

In Fig. 12, a construction is shown in which the application of the power operated braking means is dependent upon an initial manual braking effort being applied to the foot pedal. The brake rod 40, in this case, is not directly connected to the pedal 282, as in the previous cases, but instead is connected through a valve mechanism to the rod 283 which is directly connected to the pedal 282 through the pin 284. The valve mechanism interposed between the rods 40 and 283 comprises a casing 285 in which a sleeve member 286 is rotatably received. Rotatably received within the sleeve 286 is a second sleeve member 287 and a third non-rotatable sleeve 288 is received within the sleeve 287. An arm 289 is rigidly secured to the sleeve 287 and a second arm 291 is rigidly secured to the sleeve 286. The rod 40 is pivotally connected at 292 to the arm 289 and the arm 291 is pivotally connected to the rod 283 at 293. Secured to the arm 289 is a curved member 294 which extends through the opening 295 in the arm 291 and is provided with a spring 296 surrounding its free end and held under compression between the lever 291 and adjustable member 297 threadably engaging its free end. This resilient connection between the arms 289 and 291 tends to maintain the arms in fixed position relative to each other, but when the lever 282 is depressed, upon sufficient force being set up to resist movement of the rod 40, the arm 291 will move away from the arm 289 against the force of the spring 296 and the sleeves 286 and 287 will be given a corresponding rotatable movement relative to each other. The inner sleeve 288 is provided with a passage 298 which is connected by the conduit 299 to the brake operating bellows. The inner surface of the sleeve 287 is provided with a chamber 301 which is normally connected by the opening 302 with the opening 303 in the sleeve 286 which leads to the chamber 304 formed in its outer surface. The chamber 304 is normally connected by the opening 305 in the housing 285 with the atmosphere so that the interior of the conduit 299 is normally connected to the atmosphere through the opening 298, chamber 301, openings 302 and 303, chamber 304 and opening 305. The sleeve 287 is also provided with an opening 306 normally closed by the inner surface of the sleeve 286. The sleeve 286 is provided with a second chamber 307 which is constantly connected through the opening 308 in the housing 285 and conduit 309 with the source of suction. An opening 311 in the sleeve 286 extends from the chamber 307 to the outer face of the sleeve 287. In operation, when the lever 282 is depressed, the arms 289 and 291 follow each other until further movement of the rod 40 is resisted by a greater force than that set up by the spring 296, whereupon the arm 291 with its sleeve 286 rotates relative to the arm 289 and its sleeve 287. This relative movement moves the opening 303 out of matching relationship with the opening 302 and thus cuts off the conduit 299 from the atmosphere. Upon further relative movement of the sleeve 286 in respect to the sleeve 287, the opening 311 moves into matching relationship with the opening 306 whereupon the suction in the conduit 309 is transmitted to the chamber 301 and thence through the opening 298 and conduit 299 to the brake operating bellows, and causes consequent power application of the brakes. The degree of rocking movement of the pedal 282 necessary to cause power application of the brakes may, of course, be adjusted by adjusting the tension of the spring 296 by threading the member 297 on the member 294.

It is evident that if the member 282 is depressed to a position where the vacuum operating mechanism is in communication with the suction and maintained in such a position, that is, not further depressed, the two arms 289 and 291 will approach each other, due to operation of the vacuum operating mechanism, and a point will be reached where the vacuum is automatically cut off. This balancing action will automatically take place with any movement or depression of the member 282 between the point where vacuum operation begins and the point where the brakes are substantially set.

In Figs. 13 and 14, the brake pedal 312 is provided with a rocking pad 313 pivoted thereto at 314. As best shown in Fig. 14, the pedal 312 midway its height is provided with a recess 315 over which is secured a valve seat member 316. Received within the recess 315 and resiliently pressed against the inner face of the member 316 by the flat spring 317 is a valve 318 which is constantly urged upwardly by the coil spring 319. Secured to the pad 313 by screws such as 321 or other suitable means is an extension 322 formed of pressed steel into a U-shaped section to impart stiffness thereto and its free end is pivotally connected to the rod 323 which, in turn, is pivotally connected by the pin 324 to the valve 318 so that upon rocking of the pad 313, the valve 318 is given a corresponding longitudinal movement. The valve 318 is provided with a chamber 325 normally connected to the atmosphere through the opening 326 in the member 316. The opening 326 may be protected from the entrance of dust or dirt, if desired, by means of a baffle member 327 secured to the pedal 312. The baffle 327 may either be of imperforate material arranged to prevent direct entrance of dust and dirt to the opening 326 or may be of fine wire mesh or may be a combination of both. The member 316 is provided with a passage 328 arranged for constant communication with the chamber 325, it being connected by a tube 329 with the brake operating bellows. The member 316 is also provided with a passage 331 normally closed by the valve 318 and which may be connected by the conduit 332 to the source of suction preferably through a regulator such as well be described in connection with Figs. 17 and 18. Thus, when the pad 313 is rocked in a counter-clockwise direction on the pin 314, as viewed in Fig. 13, the valve 318 will be moved downwardly against the force of the spring 319 and will first cut the chamber 325 off from communication with the atmosphere through the opening 326, and will then bridge the passages 328 and 331 so as to connect the source of suction with the brake operating bellows. The position of the valve 318 with respect to the rocked position of the pedal pad 313 in this case, as well as in the other modifications in which the rocking pedal pad is employed, may be made known to the operator by the presence of a change in the resistance offered to rocking the pad 313 in the following manner:—

Secured adjacent the free end of the pedal 312 is a relatively stiff spring member 333 and slidably extending through the spring member 333 and threaded into the end of the pedal 312 is a screw 334 which is preferably so positioned as to put the spring member 333 under a slight tension. A second screw 335 slidably extends through the spring member 333 and is threaded into the free end of the pad 313. The screws 334 and 335 are so adjusted in axial position that the operator may rock the pad 313 against the relatively light pressure of the spring 319 sufficiently to move the valve 318 to cut off communication of the chamber 325 with the atmosphere through the opening 326 but not sufficiently far to cause the chamber 325 to bridge the openings 328 and 331 at the time the head of the screw 335 contacts with the adjacent face of the spring member 333. From this point on, further rocking movement of the pad 313 must be made against the resistance of the spring 333 and when such added resistance is met by the operator, he is made aware that the atmosphere has been cut off and the valve is in position where it is about to connect the suction means with the bellows in order to apply the brakes. When the pad 313 is thus rocked against the pressure of the spring 333, after the head of the screw 335 is contacted against the spring 333, the spring 333 will, in bending, draw away from the head of the screw 334. In such a case, when the operator rocks the pad 313 in a clockwise direction after he has admitted sufficient suction to the bellows to obtain the desired braking effort, the moment the spring 333 again comes in contact with a head of the screw 334, the pressure on the pad 313 will be suddenly reduced and therefore warn the operator that the suction supply means has been cut off from the bellows and that if he rotates the pad 313 slightly further in a clockwise direction, he will admit air to the bellows and release the brakes. In this manner, the operator has a certain definite feeling of the position of the valve 318 and must rock the pad 313 substantially all the way back to normal position before air is admitted to the bellows in order to release the brakes.

Figs. 15 and 16 show a modified form of vacuum regulating valve construction which may be mounted on an instrument panel, dash, or other suitable supporting surface 336 of a motor vehicle in a position to be readily accessible to the operator. In this construction, a flanged-like member 337 is provided with a rearwardly extending body portion 338 provided with an opening 339 at its forward end which opens on to the face of the flanged portion 337 and in the forward end of which is rotatably received the sleeve 341 of the handle 342. A portion of the walls of the body portion 338 surrounding the opening 339 are removed, as indicated in Fig. 15, and received within the opening 339 is a sleeve member 343, the forward end of which threadedly engages the inner surface of the sleeve portion 341 of the handle. The sleeve 343 is provided with a pair of outwardly projecting fingers 344 which prevents rotation of the sleeve 343 in the opening 339 and also serves as an abutment for the spring 345 held under compression between the same and the shoulder formed by cutting away a portion of the walls of the member 338. Thus, by turning the handle 342, the sleeve 343 is caused to move axially either one way or the other depending upon the direction of rotation of the handle 342. The rear end of the body portion 338 is provided with a chamber 346 formed by drilling out the same and plugging it. The chamber 346 may be connected by a connection 347 and conduit 348 with the conduit extending between the brake operating bellows and the source of suction previously described in connection with previous views. The body 338 is also provided with a chamber 349 connected with the chamber 346 and normally closed by the valve 351. The chamber 349 is connected with the atmosphere through passages 352. The stem of the valve 351 slidably extends into the opening 339 through the closed end of the sleeve 343 and is provided at its free end with a nut 353. A coil spring 354 is held under tension about the valve stem between the nut 353 and the closed end of the sleeve 343. As in the previously described constructions, when the suction within the conduit 348 becomes sufficiently great, the valve 351 is lifted from its seat, thereby admitting air to the conduit 348 through the passages 352 and chambers 349 and 346 and preventing greater suction from being obtained. The degree of suction necessary to lift the valve 351 from its seat is, of course, controlled by the tension of the spring 354 and this tension is, in turn, controlled by the relative position of the closed end of the sleeve 343 with respect to the nut 353. Inasmuch as this relative position of this closed end of the sleeve 343 is controlled by the position of the handle 342, it is readily apparent that by rotating the handle 342, the amount of suction which may be applied to operate the brakes may be controlled. Thus by turning the handle 342 to the position indicated in Fig. 16, the tension of the spring 354 will be decreased thus permitting the valve 351 to unseat at a relatively small drop in suction in the conduit 348, and thereby limit the amount of braking effort which may be applied by the connected bellows to a relatively small amount, such as, for instance, an amount commensurate with that necessary to apply the brakes of a motor vehicle on an icy pavement without causing the wheels to slide. Conversely, if the handle 342 is moved in a counter-clockwise direction, as viewed in Fig. 16 and from the position shown in that figure, the spring 354 will be placed under a greater tension which will consequently allow a greater suction to build up in the conduit 348 and the connected bellows before the valve 351 lifts and limits the degree of suction. In this manner, the effective maximum braking effort which may be applied to the brakes by the bellows may be easily, quickly and readily controlled by simply moving the handle 342 in order that the braking effect of the braking mechanism may be varied to correspond with the conditions of the road surface over which the vehicle may be traveling.

Figure 17:
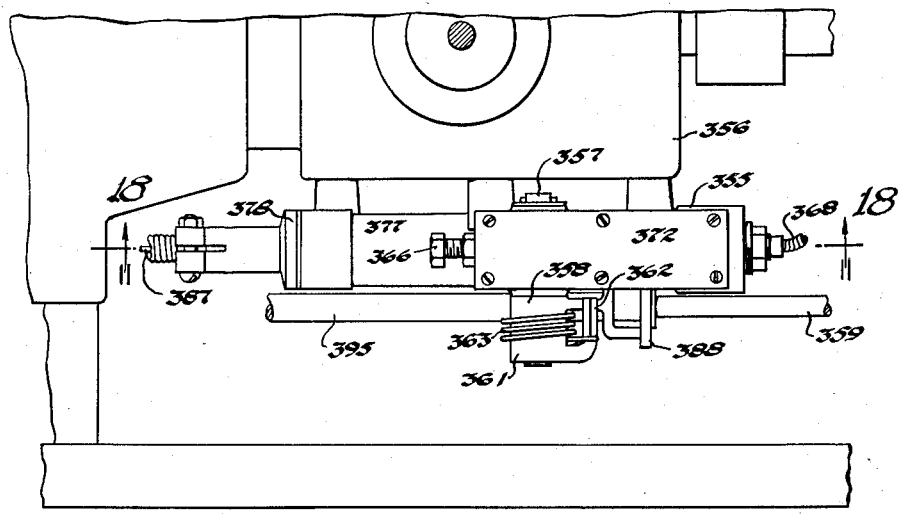
Fig. 17 is a plan view of a modified form of the control mechanism shown in Fig. 5, it being shown as supported on the transmission of a motor vehicle.
Figure 18:
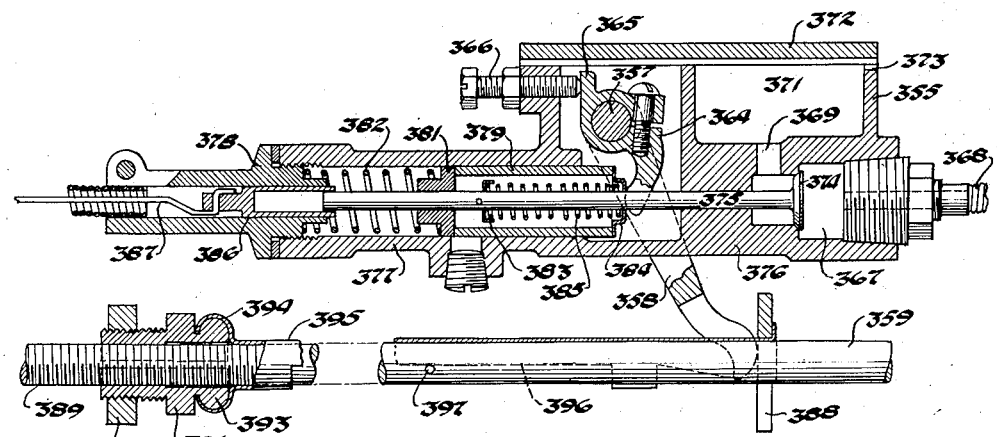
Fig. 18 is a more or less diagrammatic vertical sectional view taken on the line 18—18 of Fig. 17.

In Figs. 17 and 18, a control device similar in effect to the control device shown in Fig. 5, for controlling the degree of suction or vacuum on the brake operating bellows, is illustrated. In this case, a housing member 355 is shown secured to the side of a transmission housing 356 of a motor vehicle although it may be secured to any other suitable supporting member. The housing 355 is provided with a cross shaft 357 which rotatably receives thereon the lever 358, the lower end of which is yoked and in which is slidably received the rod 359, which may correspond to the rod 40 shown in the previous views and which is connected to the brake pedal, or may be any other rod pivotally or otherwise secured relative to the brake pedal so as to be given axial movement upon depression of the brake pedal. Secured against relative rotation to the shaft 357 on the outside of the housing 355 is an arm member 361, the arm 362 of which is bent inwardly, as indicated in Fig. 17, and normally held against the arm 358 by means of a coil spring 363. Within the housing 355 and secured against relative rotation, is a third lever 364 provided with a yoked lower end. The lever 364 is provided with a finger 365 which is adapted to engage the adjustable screw 366 in order to limit the movement of the lever 364 in one direction. The housing 355 is provided with a chamber 367 which is connected by the conduit 368 to anyone of the passages between the suction producing means and the brake operating bellows. The chamber 367 is connected by the passage 369 to a chamber 371 in the housing 355 which is closed by a cover 372 and is connected to the atmosphere through the opening 373. The communication between the chamber 367 and 371 is normally prevented by means of the valve 374 whose stem 375 extends through the wall 376 and is positioned centrally of the forwardly extending cylindrical portion 377 of the housing 355. The stem 375 passes through the lower yoked end of the lever 364 in extending forwardly from the valve 374. The forward end of the cylinder 377 is closed by the hollow fitting 378. Slidably received within the cylinder 377 is a sleeve 379 and a stop member 381. The coil spring 382 is held under compression between the stop member 381 and the fitting 378 and urges the stop member 381 rearwardly against the adjacent end of the sleeve 379. Within the sleeve 379, a washer 383 is held against axial movement on the stem 375 and a second washer 384 of a diameter substantially equal to the diameter of the sleeve 379 is slidably received on the stem 375 immediately to the rear of the sleeve 379. The coil spring 385 is held under compression about the stem 375 between the washers 383 and 384. The spring 382 is of greater strength than the spring 385 so that it moves the stop member 381, sleeve 379 and washer 384 rearwardly, co-operating with the tension in the spring 385 until the washer 384 abuts against the lever 364, and the sleeve 379 is clamped between the washer 384 and the stop member 381. Slidably received within the fitting 378 is a sleeve member 386 provided with a closed end, the stem 375 being receivable within the sleeve 386. The sleeve member 386 may be connected by a Bowden wire 387 or other suitable means to a point of control easily accessible to the operator of the vehicle (as shown at 124, 125, 126, 127 and 128 in Fig. 5 and provided with dial shown in Fig. 16) so that the axial position of the sleeve member 386 may be easily and quickly controlled by manually operated means by the operator. The rod 359 is provided with a stop member 388 against the forward face of which the yoked end of the lever 358 normally bears. The stop member 388 may be fixed against movement to the rod 359 but is preferably adjustable axially thereof, one means for effecting such axial adjustment being as follows:—

A portion of the rod 359 at a point where it is easily accessible is threaded as at 389. A split nut 391 threadably engages the portion 389 and may be locked in adjusted position by the lock nut 392. The nut 391 is provided with a flanged portion 393 which is rotatably received within the similarly shaped end 394 of the sleeve 395 which encircles the shaft 359 and extends to and is secured to the stop member 388. Relative rotation of the sleeve 395 with respect to the rod 359 may be prevented by removing substantially half of the sleeve 395 for a material distance as at 396 and inserting a pin 397 through the rod 359 so as to bear against the cut away edges of the sleeve 395. By loosening the nut 392 and rotating the split nut 391, the axial position of the stop member 388 on the rod 359 may be easily and quickly adjusted.

In operation when the brake pedal is depressed, the rod 359 is moved to the left, as viewed in Figs. 17 and 18, and carries the stop member 388 with it. The stop member 388 acting against the end of the lever 358 rotates the lever 358 and the spring 363 urges the lever 361 to follow the movement of the same. When the lever 361 thus follows the movement of the lever 358, the shaft 357 and arm 364 move in accordance with the movement of the lever 361 and the yoked end of the lever 364 bearing against the washer 384 moves the sleeve 379 and stop member 381 forwardly or to the left, compressing the spring 382 and spring 385. When the spring 385 is thus compressed, the suction within the chamber 367 necessary to lift the valve 374 and relieve such suction, is increased accordingly. Upon continued movement of the rod 359 to the left, the arm 364 will continue to move the sleeve 359 and 381 until the stop member 381 comes in contact with the end of the sleeve member 386 which thereafter prevents further movement of the stop member 381 and sleeve 379, and prevents further compression of the spring 385. Any further movement of the lever 358 merely deforms the spring 363, the arm 362 of the lever 361 moving out of contact with the lever 358. From the foregoing, it will be apparent that movement of the rod 359 to the left has the effect of increasing the amount of suction which may be built up in the brake operating bellows and that the maximum amount of pressure which may be built up in such bellows is ultimately controlled by the axial position of the sleeve 386 which serves to limit the maximum amount which the spring 385 may be compressed in any particular case. By moving the sleeve 386 by means of the Bowden wire 387, the maximum effort which may be applied to the brakes by the bellows may thus be easily and quickly controlled by the operator. The spring 382 is provided merely to insure the return of the stop member 381 and sleeve 379 to its normal position upon release of the brakes. It will also be apparent that by adjusting the position of the stop member 388 axially of the rod 359, the point at which increase in the tension in the spring 385 begins, may be controlled.

Figure 19:
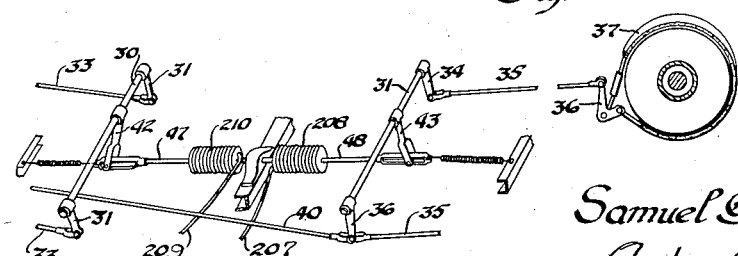
Fig. 19 is a more or less diagrammatic perspective view illustrating a modified form of mounting the power actuating members of vacuum operated brakes and which is particularly adaptable for use in connection with the control mechanism shown in Fig. 8.

The construction shown in Fig. 19 is that which is used in connection with the control mechanism shown in Figs. 8 and 9. This construction is identical to the construction shown in Fig. 1 except that the arm 38 and rod 39 are eliminated, thus disconnecting the front brakes from related movement with respect to the rear brakes. Instead of connecting the bellows 208 and 210 together, as in Fig. 1, the bellows are entirely separate from each other and the bellows 208 for the rear wheel brakes are connected by the conduit 207 to the control means and the bellows 210 is connected by the conduit 209 to the control means, the control means being such as previously described, that the suction is applied to the bellows 208 previously to the application of suction to the bellows 210, thus insuring application of the rear wheel brakes before the front wheel brakes, and making it possible to apply to rear wheel brakes only by limiting the amount of depression of the pedal 178. Inversely, by reversing the connections between the conduits and bellows so that the conduit 207 connects with the bellows 210 and the conduit 209 connects with the bellows 208, the reverse effect may be obtained.

From the above it will be apparent that a novel brake system has been shown with a number of variations in the construction of the same, and controlling means have been disclosed primarily relating to the adjustment of the vacuum regulating valve either independent of or in combination with the means for establishing communication between the expansible brake operating members and the source of suction. Means have been provided for controlling the effective suction on the brake operating means in accordance with various conditions. Means have been provided for both automatically and manually controlling the effective braking effort which may be applied by the braking means. While the form of valve means in most cases have been described as sliding valves working in housings, it will be apparent that the use of housings and sliding valves are illustrative only of a wide class of similarly constructed valves and it will be understood that any suitable type of valve that may effect the same result as that described may be employed to effect the result desired. Also, as previously mentioned, the bellows shown may well be replaced by its equivalent such as a piston and cylinder or other expansible and contractible means without affecting the present invention in any manner whatsoever and in the claims wherever the term expansible element is employed, it is to be construed as to cover the above equivalents. It will be further apparent that the particular arrangement of brake actuating mechanism may be employed with controls other than those shown and that the controls described may be employed with brake operating mechanisms other than those shown and described.

The above and other formal changes may be made in the specific embodiment of the invention described without departing from the spirit or substance of the broad invention, the scope of which is commensurate with the appended claims.

What we claim is:—

1. In a vehicle brake mechanism, a suction operated brake applying element, a source of suction connected thereto, pedal operated means for limiting the degree of suction which may be built up in said element, and manually controllable means for limiting the effectiveness of the first mentioned means at a point remote therefrom.

2. In a vehicle brake mechanism, a vacuum actuated brake applying mechanism, a source of vacuum connected thereto, a valve comprising a valve member and biasing means engaging said valve member for limiting the degree of vacuum which may be applied to said brake applying mechanism, primary means engaging said biasing means for controlling said valve, and secondary means co-operating with said primary means for varying the action thereof.

3. In a vehicle brake mechanism, a suction operated brake applying mechanism, a suction line connected to said brake applying mechanism, a valve comprising a valve member in said line and a spring biasingly engaging said valve member for limiting the degree of suction which may be applied to said brake applying mechanism, means for controlling the biasing action of said spring, and a manually controllable abutment for said spring adjustable from a point remote therefrom for varying the action of said last-named means.

4. In a vehicle brake mechanism, a suction operated member connected to a suction line, a valve in said line for limiting the degree of suction obtainable in said line, a spring urging said valve towards seated position, a pedal operated abutment for said spring, and an adjustable stop for said abutment controllable from a point remote therefrom.

5. In a device of the class described, a brake applying mechanism, a pedal connected to said mechanism for manual operation of the same, a suction operated member connected to said mechanism for causing operation of the same, a source of suction connected to said member, a valve comprising a valve member and biasing means engaging said valve member for limiting the amount of suction which said member may be subjected to, and means operable by movement of said pedal for varying the biasing action of said first mentioned means, said last mentioned means being manually adjustable.

6. In a vehicle brake mechanism, brake actuating mechanism, a suction operated member for causing movement of said mechanism, a source of suction connecting to said member, a pedal, means comprising a valve member, biasing means engaging said valve member and means connecting said pedal and said biasing means for controlling the effect of said suction producing means on said member, and other means controlled independently of movement of said pedal for modifying the action of the first mentioned means.

7. In a vehicle brake mechanism, brake actuating mechanism, suction operated means for actuating said brake actuating mechanism, a pedal operated valve for controlling the degree of suction which may build up in said suction operating means, biasing means for actuating said valve, means engageable with said biasing means for adjustably controlling the action of the same, and visual indicating means disposed in normal sight of the driver for indicating the adjusted position of said controlling means.

8. In combination with the brake mechanism of a motor vehicle including front and rear wheel brakes, linkages connecting the rear wheel brakes, separate linkages connecting the front wheel brakes, a suction operated bellows for moving the first mentioned linkages, a second suction operated bellows for moving the second mentioned linkages, and a single pedal operated control member for controlling the application of suction to both of said bellows and manually controlled adjustable means operable by the driver for limiting the degree of suction which may be developed in the bellows.

9. In a vehicle brake mechanism, in combination, a suction operated brake applying mechanism, a source of suction connected to said brake applying mechanism by means of a suction line, a valve in said line for limiting the degree of suction which may be applied to said brake applying mechanism, a stem on said valve, an abutment slidably mounted on said stem, a second abutment on said stem fixed against movement in one direction, a spring mounted on said stem and interposed between said abutments, means for moving the first mentioned abutment on said stem against the action of said spring, and means for limiting said movement.

10. In a vehicle brake mechanism, in combination, a suction operated brake applying mechanism, a source of suction connected to said brake applying mechanism by means of a suction line, a valve in said line for limiting the degree of suction which may be applied to said brake applying mechanism, a stem on said valve, an abutment slidably mounted on said stem for movement axially thereof, a second abutment on said stem fixed against movement axially of said stem in one direction, a spring mounted on said stem and interposed between said abutments, means for moving the first mentioned abutment on said stem against the action of said spring, and adjustable means for limiting said movement.

11. In a vehicle brake mechanism, in combination, a suction operated brake applying mechanism, a source of suction connected to said brake applying mechanism by means of a suction line, a valve in said line for limiting the degree of suction which may be applied to said brake applying mechanism, a stem on said valve, an abutment slidably mounted on said stem, a second abutment on said stem fixed against movement in one direction, yieldable means interposed between said abutments, yieldable means for moving the first mentioned abutment on said stem, and means for limiting said movement.

12. In a vehicle brake mechanism, in combination, a suction operated brake applying mechanism, a source of suction connected to said brake applying mechanism by means of a suction line, a valve in said line for limiting the degree of suction which may be applied to said brake applying mechanism, spring means constantly urging said valve towards one extremity of its movable position, a movable pedal, a cam associated with said pedal for simultaneous movement therewith, a yieldable member co-operating with said cam, and an abutment for said spring controlled at least in part by said member.

13. In a vehicle brake mechanism, in combination, a suction operated brake applying mechanism, a source of suction connected to said brake applying mechanism by means of a suction line, a valve in said line for limiting the degree of suction which may be applied to said brake applying mechanism, spring means constantly urging said valve towards one extremity of its movable position, a movable pedal, a cam associated with said pedal for simultaneous movement therewith, a yieldable member co-operating with said cam, an abutment for said spring controlled at least in part by said member, and an adjustable stop for limiting movement of said abutment in one direction.

14. In a vehicle brake mechanism, in combination, a suction operated brake applying mechanism, a source of suction connected to said brake applying mechanism by means of a suction line, a valve in said line for limiting the degree of suction which may be applied to said brake applying mechanism, spring means constantly urging said valve towards one extremity of its movable position, a movable pedal, a cam associated with said pedal for simultaneous movement therewith, a yieldable member co-operating with said cam, an abutment for said spring controlled at least in part by said member, a pivoted stop for limiting movement of said abutment in one direction, a movable member mounted remotely from said stop, and a link connecting said movable member and said stop.

15. In a vehicle brake mechanism, in combination, a suction operated brake applying mechanism, a source of suction connected to said brake applying mechanism by means of a suction line, a valve in said line for limiting the degree of suction which may be applied to said brake applying mechanism, spring means constantly urging said valve towards one extremity of its movable position, a movable pedal, a cam associated with said pedal for simultaneous movement therewith, an abutment for said spring, a lever member extending between said cam and said abutment comprising two parts pivotally connected together, a stop on one of said parts for limiting rotation thereof in one direction relative to the other of said parts, and spring means co-operating between said parts to constantly urge said other of said parts into engagement with said stop.

16. In a vehicle brake mechanism, in combination, a suction operated brake applying mechanism, a source of suction connected to said brake applying mechanism by means of a suction line, a valve in said line for limiting the degree of suction which may be applied to said brake applying mechanism, spring means constantly urging said valve towards one extremity of its movable position, a movable pedal, a cam associated with said pedal for simultaneous movement therewith, means for manually adjusting said cam relative to said pedal, a yieldable member co-operating with said cam, and an abutment for said spring controlled at least in part by said member.

17. In a vehicle brake mechanism, in combination, a suction operated brake applying mechanism, a source of suction connected to said brake applying mechanism by means of a suction line, a valve in said line for limiting the degree of suction which may be applied to said brake applying mechanism, spring means constantly urging said valve towards one extremity of its movable position, a movable pedal, a cam rotatably mounted relative to said pedal, a ratchet connected to said cam, means co-operating between said pedal and said ratchet for locking said ratchet to said pedal in any one of a plurality of adjusted positions, an abutment for said spring, and an operative connection between said cam and said abutment.

18. In combination with a motor vehicle having an instrument panel and a suction brake applying system including a source of suction, a suction operated brake applying mechanism and a connection between said source and said element, a valve for controlling the flow of air into said system to control the degree of suction therein, spring means constantly urging said valve towards one limit of its movable position, a movable abutment for said spring means, manually adjustable means on said panel, an adjustable stop for limiting movement of said abutment in one direction, and an operative connection between said manually adjustable means and said abutment.

19. In a fluid pressure brake operating system for motor vehicles, a fluid pressure actuated brake applying element, a source of differential of fluid pressures connected with said element by means of a pressure line, a brake lever, a valve in said line for controlling the transmittal of said pressure therethrough, means carried by said lever for moving said valve, a second valve in said line, biasing means engaging said second valve for further controlling the transmittal of pressure through said line and adjustable means connecting said lever and said biasing means for operating said last named means simultaneously with said lever.

20. In a fluid pressure brake operating system for motor vehicles, a fluid pressure actuated brake applying element, a source of differential of fluid pressures connected with said element by means of a pressure line, a brake lever, a valve in said line for controlling the transmittal of pressure therethrough, means carried by said lever for moving said valve, a second valve in said line, biasing means engaging said second valve for further controlling the transmittal of pressure through said line, a cam movable with said lever and adjustable with respect thereto, means connecting said cam and said biasing means for simultaneous operation, and means operable by the driver of the vehicle and engageable with the biasing means for limiting the differential pressure obtainable in the system.

21. In a fluid pressure brake operating system for motor vehicles, a fluid pressure actuated brake applying element, a source of a differential of fluid pressures connected with said element by means of a conduit, a brake lever, a valve in said conduit for controlling the transmittal of said pressure therethrough, means carried by said lever for moving said valve, a second valve in said conduit, biasing means engaging said second valve for further controlling the transmittal of pressure through said conduit, a cam adjustably mounted relative to said lever, means for securing said cam in any one of a plurality of adjusted positions, and a yieldable connection between said cam and said biasing means.

22. In a fluid pressure brake operating system for motor vehicles, a fluid pressure actuated brake applying element, a source of a differential of fluid pressures connected with said element by means of a conduit, a brake lever, a valve in said conduit for controlling the transmittal of said pressure therethrough, means carried by said lever and movable with or independently thereof for moving said valve, a second valve in said conduit, biasing means engaging said second valve for further controlling the transmittal of pressure therethrough, and yieldable means connecting said lever and the biasing means for said second valve for simultaneous operation.

23. A brake system for an automotive vehicle comprising brakes for the individual wheels, means actuated by differential of fluid pressures for actuating the brakes, valve means for controlling the effective pressure exerted, a brake pedal, means mechanically interconnecting the brake pedal and the brakes, cam means secured to the brake pedal and being angularly adjustable with respect to the pedal and further being operatively connected to the valve whereby to control the intensity of the fluid pressure exerted upon the fluid pressure actuating means and adjustable means for limiting the operation of the valve in order to prevent the development of differentials of pressure in the fluid pressure operated means in excess of a predetermined value, said last named means being operable by the driver of the vehicle.

24. A brake system for an automotive vehicle comprising wheel brakes and means operated by a differential of fluid pressures for controlling the brakes, a source of a differential of fluid pressures connected to said means, a valve connected between said means and the source of differential of pressure, spring means urging the valve to closed position against the urge of the differential of pressure, a brake rod for manually actuating the brakes, a movable abutment associated with the valve and engaging the spring means, a lever interconnecting the brake rod and the abutment whereby operation of the brake rod is effective to vary the urge of the spring, manually controlled stop means operable by the driver of the vehicle to limit movement of the abutment and the maximum pressure required to open the valve, and means permitting continued movement of the brake rod, after engagement of the stop with the abutment.

25. A brake system for an automotive vehicle comprising wheel brakes, pneumatic means for operating the brakes, a brake rod for manually operating the brakes, a conduit interconnecting the pneumatic means and a source of differential of fluid pressure, a valve structure in the conduit, comprising a casing, a valve having a stem reciprocable in the casing, a coiled spring upon the stem engaging at one end a fixed abutment upon the stem, and engaging at the other end an abutment slidable upon the stem, a cam for engaging the slidable abutment, and means interconnecting the cam and the brake rod, connected to permit independent movement of the rod and valve, and a manually operable stop engageable with the slidable abutment to limit movement thereof.

SAMUEL F. ARBUCKLE.
ANDREW L. VARGHA.